United States Patent [19]
Hamill et al.

[11] Patent Number: 4,790,269
[45] Date of Patent: Dec. 13, 1988

[54] METHOD AND APPARATUS FOR IMPROVED START-UP PROCEDURES IN CONVENTIONAL STEAM POWER GENERATORS AND DUAL FLUID CHENG CYCLE ENGINES

[75] Inventors: James Hamill, San Jose; Ramarao Digumarthi; William Conlon, both of Palo Alto; Dah Y. Cheng, Los Altos Hills; Chung-Nan Chang, Los Altos, all of Calif.

[73] Assignee: International Power Technology, Inc., Redwood City, Calif.

[21] Appl. No.: 176,933

[22] Filed: Apr. 4, 1988

Related U.S. Application Data

[62] Division of Ser. No. 752,570, Jul. 8, 1985, Pat. No. 4,735,043.

[51] Int. Cl.$^4$ ............................................. F22D 7/00
[52] U.S. Cl. ........................... 122/406 ST; 122/406 S
[58] Field of Search .......... 122/406 S, 406 ST, 451 S; 60/39.05, 39.55

[56] References Cited

U.S. PATENT DOCUMENTS

| | | | |
|---|---|---|---|
| 3,508,526 | 4/1970 | Michel | 122/406 S |
| 4,487,166 | 12/1984 | Haller et al. | 122/406 ST |

*Primary Examiner*—Edward G. Favors
*Attorney, Agent, or Firm*—Limbach, Limbach and Sutton

[57] ABSTRACT

An improved procedure for cold start-up of closed loop boiler set and Cheng cycle system wherein the venting step, the boiler swelling problem and blowdown step of the conventional start-up are eliminated by use of an external pressure source to increase the operating pressure in the evaporator section which minimizes premature phase change and accompanying volume increase.

6 Claims, 2 Drawing Sheets

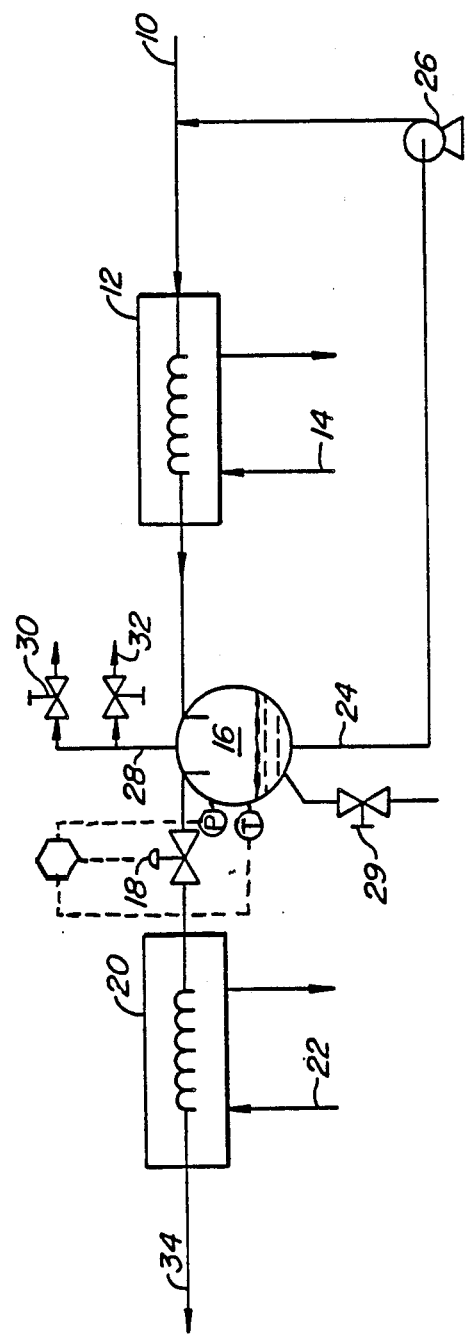
FIG._1.

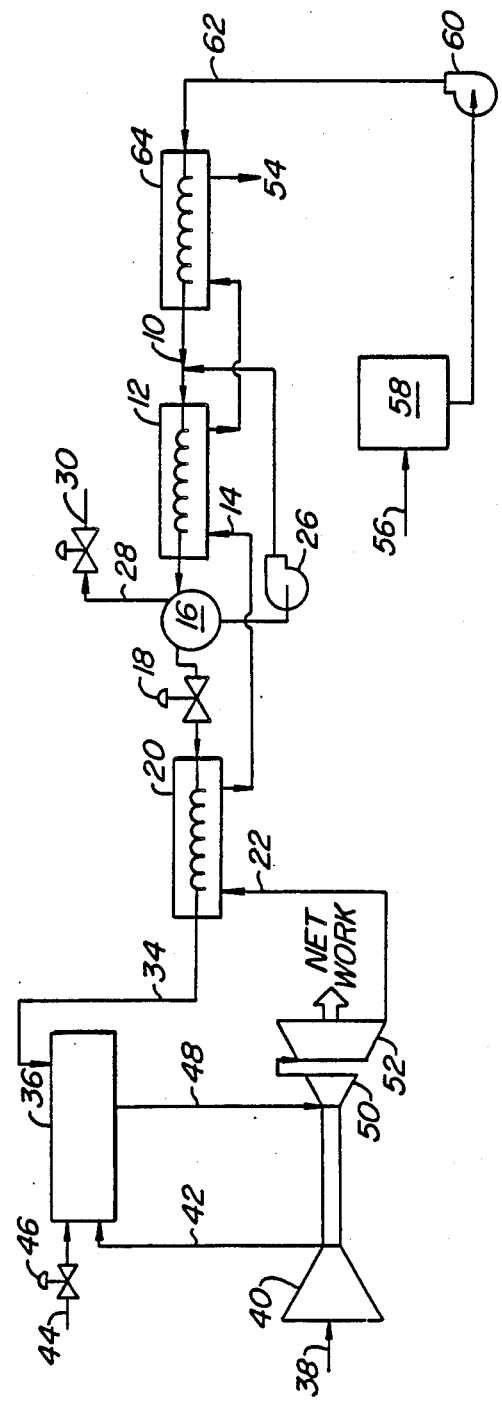
FIG._2.

METHOD AND APPARATUS FOR IMPROVED START-UP PROCEDURES IN CONVENTIONAL STEAM POWER GENERATORS AND DUAL FLUID CHENG CYCLE ENGINES

This is a continuation divisional of application Ser. No. 06/752,570, filed July 8,1985 now U.S. Pat. No. 4,735,043.

DESCRIPTION

1. Technical Field

This invention relates generally to improved procedures for starting up boiler systems, particularly conventional closed loop systems and steam injected gas turbine Cheng cycle engines.

2. Background of the Invention

The dual fluid heat engine has been described in U.S. Pat. Nos. 3,978,661, 4,128,994 and 4,248,039. Parameter optimization and control paths for the dual fluid heat engine are described in U.S. Pat. Nos. 4,297,841, 4,417,438 and 4,393,649. This invention relates to improved procedures to be used in the start-up of dual fluid heat engines utilizing the Cheng cycle as well as conventional boiler systems.

COLD START UP PROCEDURE

Conventional steam power generators utilize a closed-loop fluid system. Their boiler system generally has three components: the economizer, the evaporator and the superheater. These are closed-loop systems because the steam produced is used to power a steam turbine or to provide process steam for varied uses and, after most of the thermal energy has been extracted, the steam is condensed and returned to the boiler system. Little make-up water has to be added to the system in this scheme. As a result, any impurity in the water remains in the boiler system loop Here, the concern is with any gaseous impurities. These impurities have at least two different effects on the boiler system, depending on their corrosive properties. For non-condensable, (for these purposes, noncondensable refers to the fluid's properties at the operating conditions of temperature and pressure in steam-powered generators) non-corrosive gases, e.g., nitrogen, the accumulation of such gas in the heat exchangers reduces the heat transfer coefficient Consequently, more heat transfer area is required to heat the same amount of water or to superheat the same amount of steam. When the impurities are non-condensable, and corrosive gases, e.g. oxygen or carbon dioxide, in addition to the change in heat transfer characteristics, the corrosive gases attack the metal boiler components, further reducing heat transfer coefficients and causing longer term operating problems. An object, then, of any closed loop type system is to avoid the introduction of non-condensable gases into the boiler system.

This objective of excluding non-condensable gases has affected the start-up procedures utilized in conventional closed-loop boiler systems. As noted above, the conventional system has three major components: the economizer, the evaporator and the superheater. Normally, located between, and connected to, the evaporator and the superheater is a water storage drum. Water from this drum is circulated through the heat exchanger tubes in the evaporator section and returned to the drum. Steam is removed from the vapor space in this water storage drum and passed on to the superheater section. It is important, however, that only steam be passed on to the superheater section because entrapped liquids have a destructive effect on the steam turbine blades located downstream of the superheater section.

This steam-only requirement is particularly difficult to meet during a cold start-up procedure. As heat is added to the evaporator section, some of the water becomes steam. This phase change creates a phenomenon known as boiler swelling. Boiler swelling refers to a large change in liquid volume resulting from boiling which produces a small amount of vapor. Since the same mass of water occupies a much greater volume in the vapor phase than in the liquid phase, the presence of small amounts of water vapor in the liquid phase causes the liquid volume to swell substantially. In order to prevent entrapped liquids from being carried over into the superheater section and the steam turbine, a procedure called blowdown is used.

During blowdown, the water storage drum is vented to the atmosphere (or recycled to the make-up water system operating at atmospheric pressure), and large amounts of hot water and steam are exhausted from the water storage drum. This blowdown procedure is repeated until the desired evaporator liquid level is reached as the system begins to operate at steady-state conditions of temperature and pressure.

Blowdown in the water storage drum is a tremendously energy inefficient means for starting up the boiler. It is also an inherently lengthy process because of the removal of large amounts of energy from the system. In the conventional generation of power by steam turbines, the problems of slow start-up have never been addressed as an important issue. Avoiding any potential damage to the superheater section and steam turbine from water carryover justified any time or energy losses resulting from the blowdown procedures. The dual fluid engine utilizing the Cheng cycle, however, is an inherently fast system. Slow starting of the boiler can significantly impede fast delivery of power from the Cheng cycle system. In addition to energy loss, boiler swelling and blowdown can cause the boiler section to oscillate. Oscillation causes heat exchanger tube stress, scale deposition on the tubes and uneven heating.

The improvement in start-up procedures which is the subject of this invention begins with the recognition that the introduction of non-condensable gases is not problematic in the operation of a Cheng cycle engine, but rather, such gases are an essential thermodynamic requirement for the system's operation. By definition, a steam injected gas turbine engine utilizes both working fluids (non-condensable gases and steam) for efficient power generation. Non-condensable gases are not accumulated in the Cheng cycle system because these gases are vented to the atmosphere through the turbine and heat exchanger. Thus, the introduction of non-condensable gases to the steam side of the counterflow heat exchanger at start-up does not present significant problems, either in terms of operation or in terms of corrosion, etc. in the short term.

The Cheng cycle system boiler is comprised of the same three components as those used in conventional boilers. The water storage drum is located between, and connected to, the superheater and evaporator sections. The problems of boiler swelling and blow down have been eliminated in the cold start-up of the Cheng cycle system by pressurizing the water storage drum with air from gas turbine compressor. This excess pressure minimizes premature liquid-vapor phase change and the accompanying volume increase. As a result, the boiler can be rapidly brought up to high temperatures without fear of water carryover and without need for extensive blowdown. The non-condensable gases introduced to the boiler section during start-up are naturally removed in this open loop system.

The concept of increasing the drum pressure to minimize liquid swelling also has applications in conventional steam generators. As noted above, the introduction of non-condensable fluids into the closed-loop boiler system must be avoided. However, high pressure steam from an external source can be used to increase the drum operating pressure without introducing undesirable components. Since generator sets are often run in parallel, the product of one set can be used to efficiently start the second generator set.

It is therefore an object of this invention to provide a new and improved procedure for cold starting a boiler system which eliminates boiler swelling and blowdown;

It is an object of this improved procedure to permit fast delivery of power and steam from the system;

It is a further object of this improved procedure to provide an energy efficient means for starting-up a Cheng cycle system.

It is yet another object of this procedure to prevent the boiler system from oscillating during start-up due to boiler swelling and blowdown, said oscillation resulting in damage to the boiler section in terms of heat exchange tube stress and scale deposition.

It is a further objective of this improved start-up procedure to protect the system hardware from damages resulting from liquid carryover to the superheater section, combustion chamber or gas or steam turbine.

SUMMARY OF THE INVENTION

In a start-up procedure for a boiler system wherein the system temperature is well below its normal operating temperatures, an external pressure source is used to increase the pressure in the water storage drum. This increased pressure serves to minimize boiler swelling which results from premature boiling before the normal operating conditions are reached. In a conventional closed-loop boiler system where non-condensable gas accumulation is detrimental, high-pressure steam can be used as the external pressure source. In the dual fluid engine, which is compatible with non-condensable gases, the external pressure source can be a compressed non-condensable gas, e.g., nitrogen, or it can be the exhaust gases from the air compressor. In the dual fluid engine operating the Cheng cycle, the steam injector control valve is used to permit the flow of compressed gases from the compressor to pressurize the drum as well as to regulate the flow of steam to the superheater section once the desired operating temperatures and pressures are obtained.

BRIEF DESCRIPTION OF THE DRAWINGS

FIG. 1 is a block diagram of a conventional closed-loop boiler set.

FIG. 2 is a block diagram of one embodiment of the Cheng cycle system.

DESCRIPTION OF THE PREFERRED EMBODIMENTS

A. Cold Start-Up Procedure

1. Closed-Loop Boiler Systems

The dynamics of the start-up procedure in a closed-loop boiler system are described with reference to FIG. 1. Incoming water 10 passes through the tube side of a counterflow heat exchanger, evaporator section 12. An evaporator heat source 14 provides thermal energy to raise the temperature of the incoming water. The water then flows into a water storage drum 16. During the start-up procedure it is undesirable for the drum liquid level to become too high, forcing liquid to pass out of the water storage drum 16 towards subsequent heating steps, or a steam turbine Therefore, a valve 18, placed between the water storage drum 16 and a counterflow heat exchanger superheater section 20, is closed to prevent liquid carryover. An alternate position for valve 18 is on the downstream side of the superheater section 20, in the superheated steam line 34. It is within the scope of this invention to leave valve 18 open until boiling conditions have been established in the drum 16.

The water temperature is gradually increased by withdrawing water from the drum 16 via a liquid recycle 24 which may include an evaporator recycle pump 26. This recycle loop forces water back through the evaporator section 12, causing the water temperature to climb. When the water temperature approaches boiling conditions, a phenomenon known as boiler swelling occurs in the drum 16. The formation of vapor in the liquid substantially increases the volume of the combination, causing the liquid level in the drum 16 to vary dramatically. In the conventional start-up procedure, non-condensible gases are removed from the drum 16 by venting, through process steam line 28 and steam valve 30. To protect operators and equipment, this venting is done at low pressures. Since the heat added to the system must be limited during this venting procedure, the start-up of the conventional boiler is lengthy. Furthermore, water level control is difficult at pressures greatly below the normal operating pressure.

Liquid level swelling is addressed by draining liquid from the drum through liquid drain 29 in a procedure known as "blowdown."

The improved start-up procedure utilizes an external pressure source 32 to increase the pressure in the drum 16. This effectively raises the boiling point of the liquid in the drum 16, delaying the formation of vapor in the drum 16 until normal operating temperatures and pressures are approached. Thus, thermal energy can be quickly added to the evaporator section heat source 14 without creating boiler swelling problems When the liquid temperature in the drum 16 reaches its normal operating temperature, valve 18 can be opened to withdraw steam to the superheater section 20, without fear of damage resulting from boiler swelling. The external pressure source 32 can then be shut off as a steady state operation is approached.

The external pressure source 32 in a closed-loop system is largely limited to high pressure steam. As noted above, the introduction of non-condensable, possibly corrosive, gases into the closed-loop is detrimental to heat transfer efficiency as well as the physical condition of the metal components. It is, however, within the scope of this invention to include such non-condensable gases as an external pressure source because there are methods capable of easily removing these accumulated gases.

2. Cheng Cycle Systems

The conventional cold start-up procedure of a Cheng cycle engine is described with reference to FIG. 2. Initially the process steam control valve 30 and the steam injector control valve 18 are closed. Water is introduced into the system from make up water storage 58 by the incoming water pump 60. The incoming water flows through the economizer incoming water source 62, through the economizer section 64 and through the evaporator section 12 to the water storage drum 16. The liquid level in the water storage drum 16 must be carefully maintained to prevent liquid carryover into the superheater section 20 or the combustion chamber 36. When the start-up signal is given, the air compressor 40 provides compressed air to the combustion chamber 36 through the compressed air line 42. Hydrocarbon fuel is provided to the combustion chamber 36 from the hydrocarbon fuel source 44. The hot gases from the combustion chamber 36 then flow through the combustor exhaust line 48 to the core turbine 50 and working turbine 52 where the thermal and kinetic energies associated with this mixture of air and hydrocarbon combustion products are converted into mechanical energy, producing net work. This mixture of hot gases then flows through the turbine exhaust line 22 to a counterflow heat exchanger made up of superheater 20, evaporator 12 and economizer 64 sections The hot gas flows through the shell side of the heat exchanger, each section of the heat exchanger joined to the next by process piping. These gases, whose residual thermal energy has been used to raise the temperature of the incoming water, are exhausted at the counterflow heat exchanger exhaust 54.

The flow of hot gases through the counterflow heat exchanger rapidly increases the temperature of the water in the evaporator section 12 and water storage drum 16. This increased temperature results in boiling in the water storage drum 16, which boiling causes the volume of the liquid to expand. Since both valves 18 and valve 30 are closed, the expanding liquid has nowhere to go. As more heat is added, the pressure in the water storage drum 16 increases. To remove non-condensable gases, steam must be vented through the process steam control valve 30. This venting must be done at low pressure to protect equipment and operators which lengthens the start-up time. As the temperature of the liquid continues to increase in the water storage drum 16, water is permitted to blowdown through the process steam control valve 30. After several "blowdowns" and the passage of time, the temperature in the water storage drum 16 has reached the desired normal operating temperature. The valve 18 is carefully opened to insure that there is no liquid carryover and then steam can be withdrawn from the water storage drum 16 to the superheater section 20 for injection into the combustion chamber 36 through the steam injection line 34.

The improved cold start-up procedure which is the subject of this invention takes advantage of the dual fluid characteristics of the Cheng cycle. The introduction of non-condensable (at engine operating conditions of temperature and pressure) gases to the steam section of the engine does not present difficulties because the Cheng cycle system is open; non-condensable gases are vented through the counterflow heat exchanger exhaust 54. This eliminates the undesirable accumulation of non-condensable gases in the economizer 64 and evaporator 12 sections of the counterflow heat exchanger.

The improved cold start-up procedure differs from the conventional "blow down" method because the steam injector control valve 18 is open during cold start-up. The process steam control valve 30 is closed during cold start-up. The other steps in the procedure are essentially the same as in the conventional start-up procedure described above. By leaving the steam injector control valve 18 open during start-up, the liquid level control in the water storage drum 16 is simplified by the introduction of non-condensable gases into the drum 16. These non-condensable gases flow from the air compressor 40 back through the steam injection line 34, through the superheater 20 through the valve 18 to the drum 16. These non-condensable gases in the drum 16 are directly in contact with the air compressor 40 discharge. Thus the pressure in the water storage drum 16, substantially equivalent to the compressor discharge pressure, exceeds the vapor pressure of the water in the drum 16, preventing the increase in liquid volume known as boiler swelling. With the premature boiling of liquid in the water storage drum 16 minimized, there is a greatly reduced possibility of liquid carryover into the superheater 20 and combustion chamber 36. Further, blowdown through liquid drain 29 is minimized or eliminated.

As the system approaches steady state, in a shorter period of time, since energy inefficient blowdown has been avoided, the temperature of the water in the water storage drum 16 approaches the boiling temperature of water at a pressure equivalent to compressor discharge pressure. At this point, the vapor pressure of the water in the drum 16 exceeds the air compressor 40 discharge pressure. When this occurs, steam begins to flow out of the water storage drum 16 through the steam injector control valve 18, through the superheater 20 and to the combustion chamber 36 through the steam injection line 34. Once steam flow begins in the steam injection line 34, optimum engine performance can be regulated, in part, by the trim of the steam injector control valve 18. Furthermore, steam flow naturally removes non-condensable gases from the drum 16 and discharges them through the gas turbine 50. The dissolved gases (e.g., carbon dioxide) in the water are also naturally removed from the drum 16 and discharged. The interconnecting piping 19 between the drum 16 and superheater 20, and also between the superheater 20 and air compressor 40 (piping partially designated as 34), are naturally warmed first by the gases from the air compressor 38, and then from the steam flow, thereby minimizing thermal-expansion induced stresses.

It is not necessary that the steam valve injector control valve 18 be open when the air compressor 40 is activated to practice this invention. One embodiment relates to the use of the air compressor 40 exhaust gases to increase the drum pressure. Any procedure whereby the compressor 40 is permitted to communicate directly with the drum 16, prior to obtaining steady state operating conditions is within the scope of this invention. Any valve configuration or sequencing which accompanies this is specifically within the scope of this invention.

The water storage drum 16, in one embodiment of this invention, contains temperature and pressure probes. These probes are then linked to a control system for regulating the valve 18 trim. This control system enables, in part, the shorter time period required to start-up a Cheng cycle system while practicing this invention.

Finally, this start-up procedure for the Cheng cycle system has been described with reference to the use of the air compressor exhaust gases as the external pressure source used to increase the water storage drum pressure. Other embodiments of an external pressure source are intended to be within the scope of this invention and the claims appended hereto. For example, compressed nitrogen may be introduced into the water storage drum 16 through the process steam line 28. If compressed nitrogen were utilized, it would not be necessary to maintain valve 18 open to permit communication with compressor 40 exhaust gases since the nitrogen alone would increase the drum pressure. Valve 18 would be opened, in this embodiment, when the drum temperature approached steady state operating temperatures.

Obviously, other modifications and variations of the present invention are possible in light of the above teachings. It is therefore to be understood that changes may be made in the particular embodiments described herein which are within the scope of the appended claims.

We claim:

1. An improved start-up procedure for a steam producing boiler, which boiler comprises, in part, an economizer section, an evaporator section, a superheater section and a water storage drum located between and connected to said evaporator and superheater sections and wherein said improved start-up procedure comprises the steps of:
   (a) increasing the pressure in said drum by providing an external pressure source to the drum, said increased drum pressure substantially greater than atmospheric pressure;
   (b) applying heat to said evaporator and superheater sections;
   (c) maintaining said drum in communication with said external pressure source as the liquid temperature in said drum approaches its normal operating temperatures, and;
   (d) obtaining steady state operation of said boiler, producing steam of desired quality for subsequent process steps.

2. The improved procedure of claim 1 wherein step a precedes step b.

3. The improved procedure of claim 1 wherein step b precedes step a.

4. The improved procedure of claim 1 wherein said external pressure source comprises means for providing high pressure steam.

5. The improved procedure of claim 1 wherein said external pressure source comprises means for providing non-condensable, compressed gases 6. The improved procedure of claim 1 wherein said boiler additionally comprises a combustion chamber and air compressor, and further wherein said external pressure source comprises compressed gases exhausted from said air compressor.

* * * * *